_United States Patent Office_

3,409,440
Patented Nov. 5, 1968

3,409,440
HEAT-STABLE WHEAT GLUTEN SUSPENSIONS
Josef Höhl, Hannover, Germany, assignor to
Werner Bahlsen, Hannover, Germany
No Drawing. Filed Mar. 1, 1965, Ser. No. 436,297
8 Claims. (Cl. 99—17)

ABSTRACT OF THE DISCLOSURE

A heat-stable beatable wheat protein suspension is produced by bringing denaturized wheat gluten into an aqueous suspension and establishing a pH of 3.7 to 4.9 by the addition of a food acid. The protein may be denatured either before or as a result of the acid addition. The stable froth produced can be used as a completely equivalent replacement for animal albumin in the production of bakery goods.

---

The invention relates to a method of producing heat-stable, beatable wheat protein suspensions.

In producing bakery goods, pastry or meringues the white of egg used is frequently beaten up into a froth and added in this form to the material to be baked. Particularly when producing meringues or similar pastry it is necessary for the froth to be voluminous and stable so that it does not collapse before or during the baking. As it has not been possible hitherto to produce froth suitable for this purpose from vegetable albumina, up till now animal albumin has been used exclusively.

It is of course already known to solubilize cereal protein containing gluten with water containing lime and produce a foam. Here a partial hydrolysis takes place as a result of which the albumin is in fact beatable, but not heat-stable. But when using beatable albumin, particularly when using it in the bakery industry, such heat-stability is of great importance.

It is already known that gliadin, a constituent of albumin, is beatable in an acid medium. It is however necessary when using gliadin to isolate it, which is laborious and expensive so that its practical use is out of the question and in fact in practice therefore vegetable albumina have not hitherto been used.

It has now surprisingly been found that a heat-stable beatable wheat protein suspension can be produced in a very simple manner without separating off individual albumin constituents by bringing denaturized wheat gluten into an aqueous suspension and establishing a pH of about 4 by means of a food acid. In this way a voluminous stable froth can be produced. Such a froth can be used as a completely equivalent replacement for animal albumin in the production of bakery goods, particularly biscuits, meringues and the like, with the further essential advantage of heat stability. Wheat of European origin, that is to say wheat with weak gluten, is particularly suitable as a starting product.

Vegetable albumin has the special advantage over animal albumin in that it is satisfactory from the bacterial viewpoint, while animal albumin is never free from bacteria.

Furthermore vegetable albumin is simpler to obtain as the troublesome and time-consuming beating of the eggs becomes superfluous. It is also cheaper than animal albumin.

In the production of bakery goods the use of vegetable albumina has the further advantage that the inherent taste of the animal albumin is avoided, the aromatic substances being purer and having a better effect. A particularly pure taste is obtained, if, in accordance with the invention, the deposit forming during the production of the aqueous suspension is separated off. In this case enough water must be used as a dispersing means for a liquid to be obtained and a deposit to be able to form.

Glutens occurring as side products in the production of wheat starch can also be used in the method according to the invention.

The method in accordance with the invention has the advantage that it is posisble to dispense with the isolation of individual types of albumin and their special treatment, and yet can obtain a froth which is at least equivalent to that obtained with animal albumin.

Albuminous substances treated by the method in accordance with the invention have the further advantage that they are also completely effective as regards bakery requirements without necesarily frothing and can also be used for glazing without being whisked to a froth.

Tartaric acid, citric acid or ascorbic acid can be used with great advantage for the acidulation, yielding particularly good results.

According to a further feature of the invention there can be added to the suspension a low aliphatic, physiologically compatible polyol with at least two C atoms.

The alcohol is preferably added in a proportion by weight of albumin to alcohol or about 1:1 to about 10:1.

The method in accordance with the invention will be explained in more detail in the following examples:

EXAMPLE 1

50 g. of denaturized wheat gluten were placed in suspension in 200 cc. of water and 1 g. of tartaric acid added (pH—3.7). This suspension was beaten for 20 minutes at room temperature and 1,200 cc. of a stable froth were obtained.

EXAMPLE 2

50 g. of denaturized wheat gluten were placed in suspension in 250 cc. of water and 2 g. of tartaric acid and 30 g. of glycerine added (pH—4.5). After beating at room temperature 3,300 cc. of froth were obtained, which was very stable.

EXAMPLE 3

A similar experiment to that in Example 2 was carried out with ascorbic acid instead of tartaric acid and brought to a pH value of 4.9, 3,100 cc. of froth being obtained. Although the froth was not so compact and solid as that obtained using tartaric acid, nevertheless it was fully equivalent to that obtained from animal albumin.

If however 50 g. of denaturized wheat gluten were placed in suspension in 200 cc. of water and neither acid nor alcohol added, then after beating for ten minutes definitely no froth was found to form. After thirty minutes beating, the product appeared as a frothy mash, but there was no snow-like appearance.

In the examples water at room temperature was used for the production of the albumin suspension. If the temperature of the water is raised the beating times are shortened; the most favourable results are obtained with water from about 60° to 100°.

The addition of fats in quantities up to about 40–50% by weight in relation to the denaturized gliadin-containing vegetable albumin did not have a deleterious effect on the foamability and stability of the froth.

The method in accordance with the invention is not restricted to the production of a froth of vegetable albumin suitable for bakery purposes but can be used with equal advantage wherever animal albumin froth is used, for instance for foam glazes, moulding preparations and even for firefighting foam.

Vegetable albumin denaturized by heat or extraction, for instance the various cereal glutens, can be used for the method in accordance with the invention without a special preliminary treatment.

The denaturization can be effected by heating the gluten to at least about 50°.

It can however also be effected by removing the lipoproteins by extraction, a solvent mixture of methanol-ether in the proportion of 1:1 being used for instance. For this purpose about 500 g. flour with 1.5 litres of solvent mixture repeatedly shaken are allowed to stand for about 24 hours at room temperature. The upper layer is then poured off and the residue dried in vacuuo.

Such denaturized glutens are however also obtainable commercially.

The albuminous substance produced by the method in accordance with the invention yields a froth which is extraordinarily resistant to heat.

The water dissociation of the foam or froth is considerably increased beyond what is found with foam or froth obtained from white of egg, so that there is less deposit than in the case of white of egg froth.

When the froth obtained from the albumin produced in accordance with the invention is used for producing cream puffs or meringues there is no need for heating in an oven, as the meringues can simply be dried at ordinary temperature.

Malic acid has also proved successful as a food acid.

It has also proved possible to work without the denaturing stage for the wheat gluten as the added food acid added effects the denaturization of the gluten yielding a beatable, heat-resistant product.

It has been found furthermore that "air sifted or filter flour" can also be used as a starting product of the method according to the invention, the said flour being obtained as a powdery flour mill dust with a high gluten content in pneumatic mills by filtering the out-going air of the pneumatic conveying installations and the air separators.

It is possible to wash the gluten out from this product in conventional manner and simply to acidify the said gluten according to the invention, or it is also possible to react the product with the food acid necessary without washing out the starch constituents, degreasing or other treatment, a very strong heat-resistant foam or froth resulting.

Such a filter flour consists for instance of:

Gluten: 45.70%.
Water: 11.87%.
Starch, fat, crude fibre, residue.

EXAMPLE 4

50 g. filter flour was suspended in 250 g. cold water, reacted with 0.3 g. citric acid (pH value of the mixture 4.1) and then beaten in a beater machine. A stable foam was obtained from which meringues with a satisfactory taste were produced after adding a corresponding quantity of sugar.

EXAMPLE 5

50 g. filter flour were suspended in 250 g. cold water, reacted with 0.4 g. malic acid and then beaten in a beater machine. A stable froth resulted from which meringues with a satisfactory taste were produced after adding a corresponding quantity of sugar.

EXAMPLE 6

50 g. filter flour were suspended in 250 g. cold water, reacted with 1.0 g. ascorbic acid (pH value of the mixture 4.2) and then beaten in a beater machine. A stable froth resulted from which meringues with a satisfactory taste were produced after adding a corresponding quantity of sugar.

It was also found that in individual cases a larger addition of food acid was not injurious, that is to say adjusting to a lower pH value, for instance about 3.

What is claimed is:

1. A method of producing beatable aqueous suspensions of wheat gluten, comprising bringing denaturized wheat gluten into an aqueous suspension having a pH value in the range of 3.7 to 4.9, obtained by the addition of a food acid to the water, in order to produce suspensions adapted to yield heat-stable foam.

2. A method as claimed in claim 1, characterized in that the food acid is selected from the group consisting of tartaric acid, citric acid and ascorbic acid.

3. A method as claimed in claim 1 characterized in that a low aliphatic, physiologically compatible polyol with at least 2 C atoms is added to the suspension.

4. A method as claimed in claim 3, characterized in that the polyol is added in a proportion by weight of albumin to alcohol of about 1:1 to about 10:1.

5. A method as claimed in claim 1, characterized in that the deposit formed in the aqueous suspension is separated off.

6. A method as claimed in claim 1, characterized in that high-gluten-content "pneuma- or filter flour" is used as starting product.

7. A method as claimed in claim 1, characterized in that the denaturization of the wheat gluten is effected by food acid.

8. Aqueous, beatable suspension of wheat protein denaturized by a food acid, said suspension being adapted to yield a heat stable foam and having a pH of 3.7–4.9.

References Cited

UNITED STATES PATENTS 3,014,801   12/1961   Evans _____ 99—17

LIONEL M. SHAPIRO, *Primary Examiner.*